United States Patent [19]

Grimpe

[11] 3,975,923
[45] Aug. 24, 1976

[54] OVERLOAD CONTROL COUPLING BETWEEN TWO ROTATING MACHINE ELEMENTS

[75] Inventor: Karl Grimpe, Mulheim (Puhr), Germany

[73] Assignee: Demag Aktiengesellschaft, Germany

[22] Filed: June 23, 1975

[21] Appl. No.: 589,547

[30] Foreign Application Priority Data
June 26, 1974 Germany............................ 2430541

[52] U.S. Cl...................................... 64/28 R; 64/6; 64/12; 403/2
[51] Int. Cl.²........................................... F16D 3/56
[58] Field of Search.............. 64/28 R, 6, 12; 403/2, 403/335, 338

[56] References Cited
UNITED STATES PATENTS

| 2,300,778 | 11/1939 | Cornwell | 64/28 |
| 2,327,604 | 8/1943 | McCartney | 64/12 |
| 3,851,498 | 12/1974 | Rice | 64/12 |

FOREIGN PATENTS OR APPLICATIONS

| 743,522 | 10/1932 | France | 64/28 R |
| 1,330,335 | 4/1962 | France | 64/28 R |
| 500,901 | 9/1926 | Germany | 64/28 R |

Primary Examiner—Samuel Scott
Assistant Examiner—Randall Heald
Attorney, Agent, or Firm—Mandeville and Schweitzer

[57] ABSTRACT

An overload control coupling between two rotating machine elements, particularly the driving part and the driven part of a coaxial shaft mechanism with at least two essentially semi-cylindrical extensions radially arranged at the interface of the coupled machine elements and uniformly distributed over the circumference, the extensions each comprising portions from the coupled machine elements, which portions form cylinders having a separation plane or interface parallel with the rotation plane of the machine elements, the extensions being embraced by annular power-transmitting carrier links connecting the machine elements. In the case of overload, the machine elements may separate and disrupt the connection by the breaking of the carrier links at predetermined excessive stress levels.

7 Claims, 9 Drawing Figures

OVERLOAD CONTROL COUPLING BETWEEN TWO ROTATING MACHINE ELEMENTS

BACKGROUND OF THE INVENTION

Overload coupling devices have been previously disclosed (FR-PS 1,330,335) where the connecting or carrier links are made of elastic material, such as rubber. This ensures that alignment deviations between the coupled shafts do not have any disadvantageous effects. At the same time, a certain degree of vibration adsorption is obtained. Furthermore, the elastic links have failure or breaking points which allow the disconnection of the shafts in case of an overload.

Couplings of this kind, however, can be utilized only where some degree of torsion between the shafts is permissible or where torsion does not cause any damage. Thus, this type of coupling cannot be used for drive equipment with alternating loads, where the driven machine element must at all times maintain the same angular velocity as the driving machine element. Also, it is not possible to exactly determine with reliability and precision the overload point at which the elastic carrier links are to fail. Countless driving devices, however, depend on this requirement. Finally, the disposition of the elastic links fractured or otherwise destroyed in the case of overload is not adequately effected in these couplings. It is to be expected that the broken pieces of the carrier links may slip between the advancing edges of the extension halves or other portions of the machine elements still rotating and pass the extension halves or other portions of the machine elements which have already come to a stop, thus damaging the coupling.

SUMMARY OF THE PRESENT INVENTION

It is an object of the present invention to provide an overload control of the former type, the stopping (or breaking) point of the links of which can be predetermined with as little tolerance and as much reliability as possible and the design of which avoids damage to the coupling elements resulting from broken carrier links.

In accordance with the invention, the carrier links comprise annular elements or rings made of strong, rigid material, such as hardened steel, which embrace extensions of the coupled machine elements under an initial stress, camming scrapers are arranged between the extensions in peripheral directions, and their projected radial lengths equals at least those of the extensions. The camming scraping surfaces are in axially extending planes, parallel with the shaft, and are either planar or arched outward, each forming an angle of at least 90° with the exterior lower surfaces of the adjacent extensions. The use of carrier links made of strong, rigid material offers the special advantage that they may be installed in a prestressed condition, which, in turn, permits a precise and reliable predetermination of the failure point of the coupling, since the stress limit of the material under consideration, e.g., hardened steel, is, of course, very well known.

Another important advantage of the carrier links, according to the principles of the invention, is that, in case of failure, they may be replaced quickly and easily. It is also a very important aspect of the invention that the condition of the new and improved carrier links may be simply and easily checked or otherwise inspected during routine maintenance. This has advantages which are not even present in the case of previously known break-bolt couplings, where the stopping point cannot be predicted with the same degree of accuracy as in the case of the present invention, and where the control and inspection of the connecting bolts with respect to fatigue signs is also impossible without first dismantling the bolts. The use of the camming scrapers ensures that the carrier links do not slip into the spaces between two revolving extensions and damage them in case of a break. Actually, the specific failure site where the carrier links will break under overload conditions cannot always be predicted, although in general, this break should occur near the interface of the semi-cylindrical extensions. As only one breaking point or line of fracture is to be expected, the resultant half open ring, particularly in slow moving installations, may be carried along by one of the extension elements. The surface of the next successive camming scraper then ensures that the respective fractured carrier link is elevated and, therefore, is free to pass the next extension without interference.

A further detail of the invention provides that the curvature of each semi-cylindrical cross section at the extensions in the transition area towards the level separation plane is either continuously and/or increasingly arched towards the latter, and that the level separation planes of the extensions are coupled or fit together in face-to-face relation without tolerances.

The tolerance-free fit of the extension halves during operation is important due to the following considerations: In order to obtain an economically justified overload control, the position of the power-transmitting component must be as steep as possible in the peripheral direction. The load introduced tangentially at an extension half is transmitted via the power-transmitting component to the other extension half. Thus, the working efficiency of the coupling is determined by the position of this power-transmitting component between the extension halves. If the coupling is designed so that an optimum steepness is achieved, i.e., the component approaches the position of the tangential force, the efficiency of the overload control increases. The mutual support of the link carriers in an axial plane, due to the tolerance-free arrangement of extension halves, permits the use of connecting elements under an initial prestress. Only if the extension halves are free of connection tolerances will the initial prestress forces be of mutual benefit and effect. For an overload control of the present type, this results in an optimum relation between transmittable torque and coupling size. Simultaneously, the tolerance-free fit of the extension halves eliminates the occurence of additional bending stress at the foot of the extensions. Furthermore, this arrangement makes it possible to minimize the cross-sectional areas of the extensions. In accordance with the invention, the curvature of the semi-cylindrical cross sections of the extension halves in the transition area, i.e., towards and at the level separating plane, assures that, in the case of a minor displacement of the extension halves in peripheral direction, no stress concentration develops in the carrier link, which stress concentration otherwise might lead to premature breaking of the annular carrier link.

The avoidance of such undesirable stress concentration, in accordance with another aspect of the invention, may be achieved by arching or otherwise curving the interior wall sections of the annular carrier links facing the edges of the adjoining separating planes so that they recede from the generally circular cross-sectional profile of the extension halves. This measure eliminates contact between the extensions and the interior walls of the carrier link rings at the separating plane edge, even if the extension halves are slightly displaced in a peripheral direction during operation.

The most favorable conditions result if the coupled elements absorbing the axial thrust are provided with devices or means maintaining a constant coefficient of friction, so that the overload limit is not altered by unexpected frictional forces.

In accordance with another aspect of the invention, the frontal planes of the vertically arranged semi-cylindrical extension may be provided, along the separating plane edges, with scale divisions facing each other. Such scale divisions make it possible to determine the extent of the overload in case of plastic deformation of the carrier links. It is quite possible that the overload is not sufficient to destroy or fracture the carrier link, but to cause only a slight plastic deformation of the carrier link. In this case it may be important to determine the extent of the overload which caused the deformation in the carrier link. The scale division may be calibrated, graphically or mathematically, so that the relative displacement of the extension halves caused by the plastic deformation of the carrier links may directly indicate, through knowledge of the tensile strength of the material, the extent of the overload.

For a more complete understanding of the principles of the present invention and for a better appreciation of its attendant advantages, reference should be made to the following detailed description of preferred embodiments thereof taken in conjunction with the accompanying drawings.

DETAILED DESCRIPTION OF THE INVENTION

Figure 1:
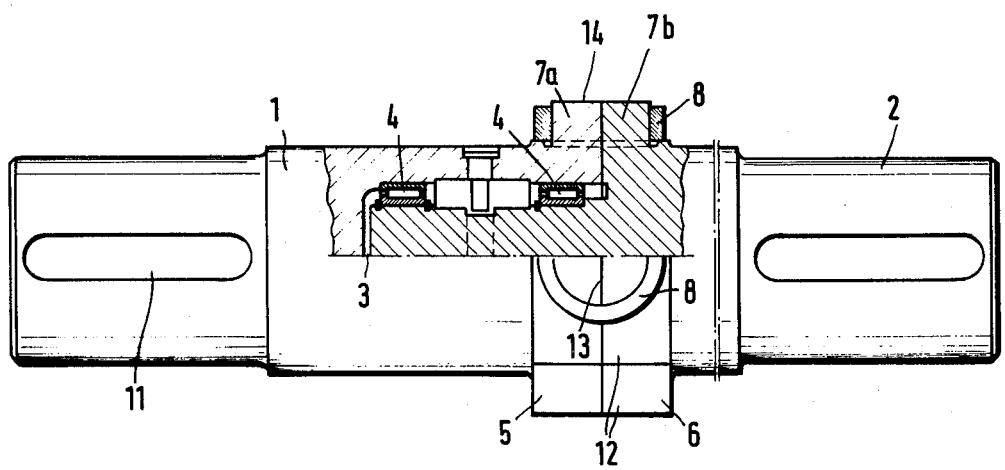
FIG. 1 is a side elevational view of an overload coupling embodying the principles of the present invention and having parts broken away to show a partial longitudinal cross-sectional view of the details of the construction of the elements thereof.

Referring now to the drawings and the several views thereof, like elements are given like reference numerals throughout. In FIG. 1 the element inducing torque, the driving shaft, is numbered 1; the element to which torque is transmitted, the driven shaft, is numbered 2. The element 1 is provided with a bore hole, open on the frontal plane into which an appropriately, matingly tapered end of the element 2 projects and where the tapered end is supported for rotation by roller bearings 4.

Both shaft elements 1 and 2 include enlarged portions in the form of flanges 5, 6 at their frontal planes adjoining the parting line or interface 13. The flanges 5, 6, disposed on the shaft elements 1, 2, respectively, are machined in such a manner that the flanges 5, 6 each have three semi-cylindrical extensions 7a, 7b, respectively, uniformly distributed over the circumference. The semi-cylindrical extensions 7a, 7b, fit without tolerance along parting line 13 and thus combine to establish complete cylinders, whose major axes are radially disposed with respect to the longitudinal axes shaft elements. The cylindrical extensions formed by the two halves 7a, 7b are surrounded and tightly gripped by annular carrier links or rings 8. In accordance with the invention, the carrier links 8 connect the shaft elements 1 and 2 and are set into place under a determined initial prestress. The carrier links 8 are gaged to fracture at a certain torque, the breaking or "overload control" point of the coupling.

Figure 2:
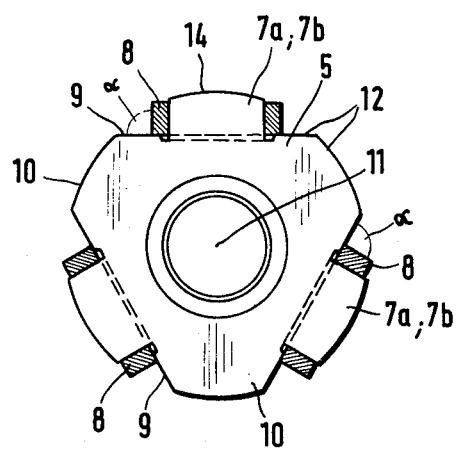
FIG. 2 is a transverse cross-sectional view of the coupling in FIG. 1.

As shown in FIG. 2 and in accordance with the invention, the flange portions between the extensions 7a, 7b, are designed as camming scrapers 10 having external scraper planes 12. The largest radial extent of the scraper cams 10 corresponds with that of semi-cylindrical extensons 7a, 7b. As shown, the scraper planes 12 start at the base of each extension 7a, 7b, forming an angle $\alpha$ with the extension exterior, such angle being 90° in the FIG. 2 embodiment of the invention. The example shown in FIG. 2 has scraper planes running in a planar, flat plane before arching at the region of greatest extension.

Figure 3:
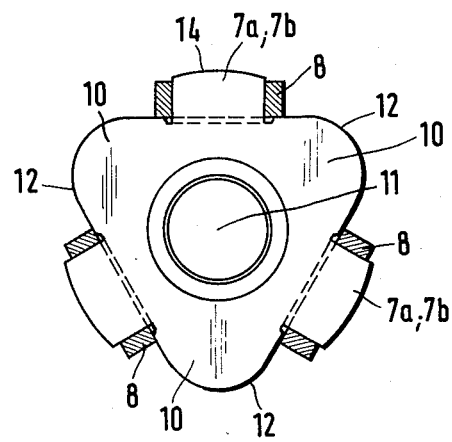
FIGS. 3 and 4 are cross-sectional view of couplings of the present invention similar in all respects to that of FIG. 1, with the exception of the camming-scrapping surfaces, which are modifications of those shown in FIG. 2.

In FIG. 3, another type of camming-scraper is illustrated. In this embodiment, the scraper plane 12 starts at the base of extension 7a, 7b and curves towards the furthest radially extended portion thereof (with respect to central, major longitudinal axis 11).

Figure 4:
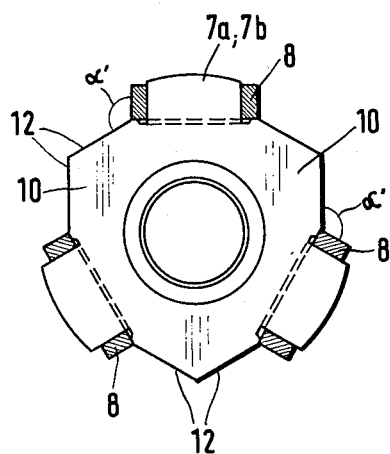

A third possibility is shown in FIG. 4, in which the scraper planes 12 run at the angle $\alpha'$ of greater than 90° from the exterior of cylindrical extensions 7a, 7b. In all of the cases (FIGS. 2, 3, and 4) however, the radial length of that point of the scraper 10 which is furthest removed from the shaft axis 11, and the radial length of the frontal plane 14 of extensions 7a, 7b (its spacing from the axis 11) is the same.

Figure 5:
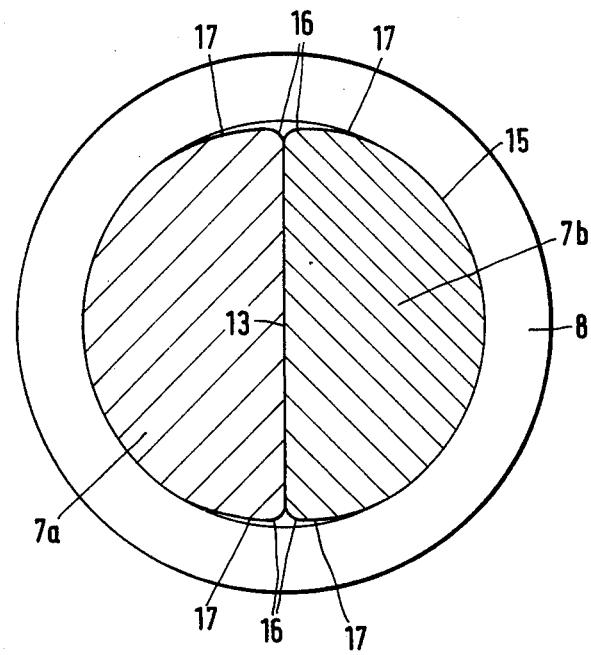
FIGS. 5 and 6 are enlarged, cross-sectional views taken through planes normal to the semi-cylindrical extension elements of the coupled machine elements.

A cross-sectional view taken through one of the extensions 7a, 7b, and the carrier link 8 surrounding it is shown in FIG. 5. In the transition area towards level separating plane 13 (the interface between elements 1, 2), the specific arch or curvature 15 of the semi-cylindrical cross sections 7a, 7b, is adjusted or corrected so that the edges are rounded off as curves 16, 17. These curves serve to eliminate the shearing effect of the edges with respect to the carrier links 8, in the event that the extensions 7a, 7b are displaced slightly along the parting line 13 while under an operating load.

Figure 6:
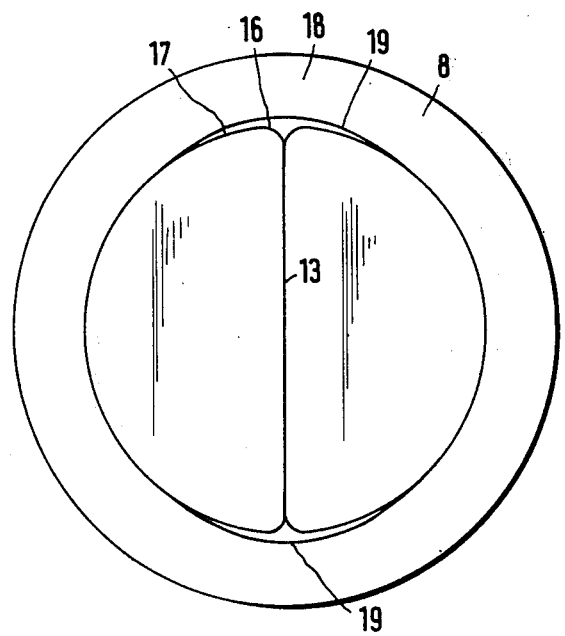

An alternate overload control embodying the inventive principles is shown in FIG. 6. Here the cylindrical carrier link 8 is thinner walled at 18, in the area of the edges of parting line 13, so that interior wall 19 of the annular links 8 does not come into contact with the exterior surface of 7a, 7b. In such a design, care must be taken to prevent the rotation of carrier link 8 on extensions 7a, 7b, as should be understood.

Figure 7:
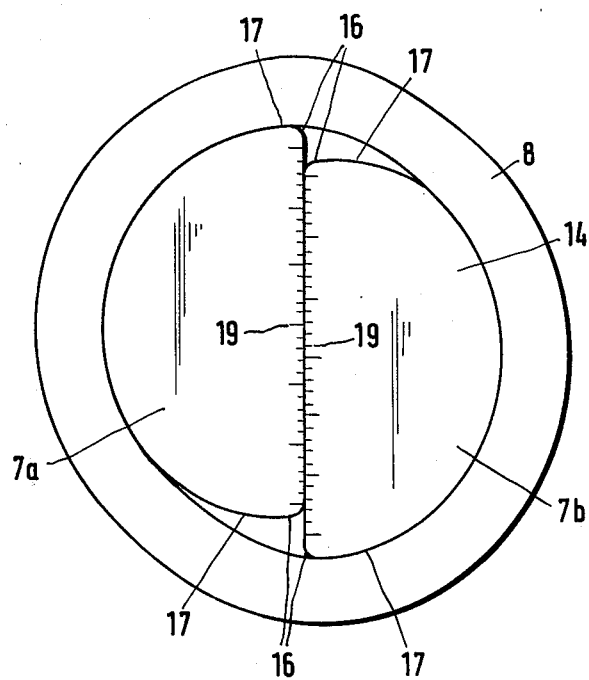
FIG. 7 is a plan view showing the ends of displaced calibrated, semi-cylindrical extension elements of the present invention.

In the embodiment of the invention shown in FIG. 7, the edges of the elements 7a, 7b, along the parting line 13 and at the frontal planes 14, are provided with calibrated divisions 19 forming scales from which the extent of relative movement of the extension halves 7a, 7b may be read.

Figure 8:
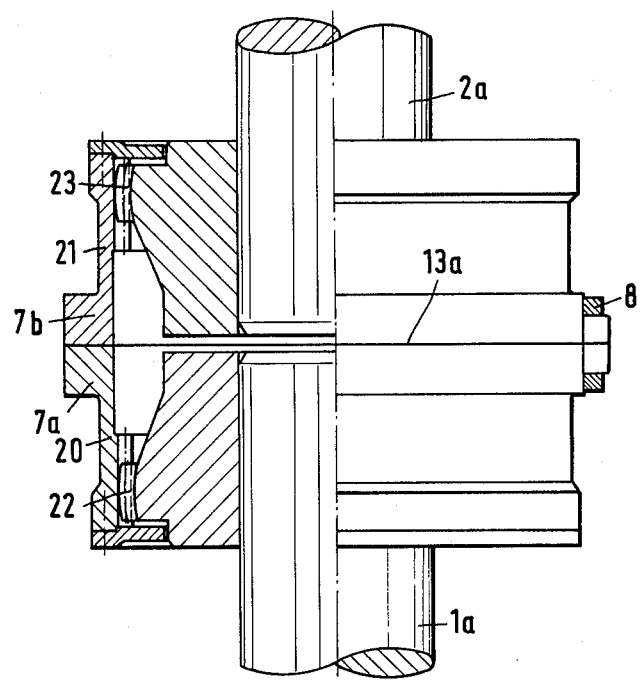
FIG. 8 is a side elevational view of a gear coupling embodying the principles of the invention and having parts broken away to show cross-sectional details.
Figure 9:
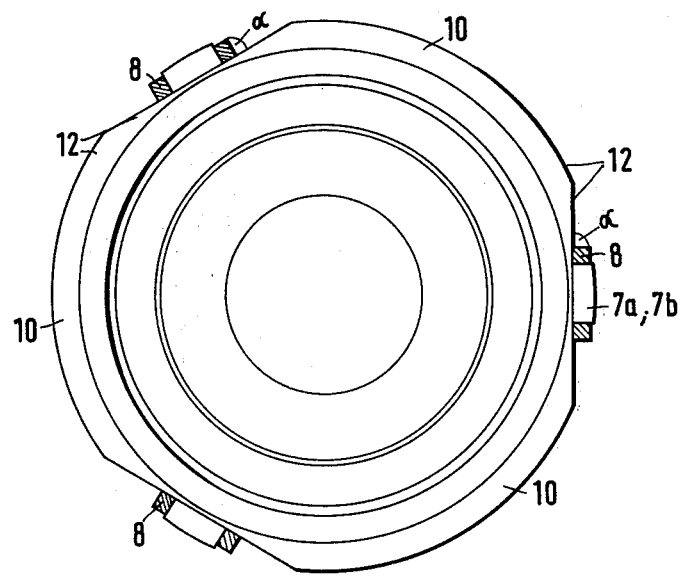
FIG. 9 is an end elevational view of the joint of FIG. 8.

Another example of the invention is shown in FIGS. 8 and 9 and represents a double Cardanic shaft connection for a gear coupling. The gear coupling consists of driving shaft 1a and a gear wheel 22 attached to it, as well as driven shaft 2a having a gear wheel 23, corresponding to gear wheel 22 attached to it. An enveloping sleeve with an involuted interior making a clutch connection with the gear wheels 22, 23 consists of two halves 20, 21, each of which is provided with extensions halves 7a, 7b which make up cylindrical extensions along the parting line 13, in accordance with the invention. Thus, the connection between the sleeve halves 20, 21 is established by cylindrical carrier links 8 of the type described hereinabove.

MODE OF OPERATION

In operation, the extensions comprising semi-cylindrical halves 7a, 7b of both shaft elements 1, 2 and 20, 21, respectively, form an angle of 90° or more with the scraper planes 12. As soon as there is an overload, causing the carrier links 8 to rupture, the extension halves 7a move angularly relative to the halves 7b. The edges of scraper planes 12 of the shaft element 1 (or the sleeve element 20) form an acute angle with the edges of separating planes of the extension halves 7b of the other shaft element 2 (or the sleeve element 21). This angle decreased with increasing torsion and would become an angle of shear, if the scraper planes 12 were not provided. The planes 12 prevent the formation of an angle of shear and simultaneously create a radial force pushing the torn carrier link outward. Due to the fact that scrapers 10 project outwardly at least for the limit of the extensions 7a, 7b, the elevation of the torn carrier links 8 over extensions 7a and 7b, respectively, of the remaining part of the overload control, and the subsequent stripping of the torn links therefrom are assured.

The annular carrier links 8 are preferably polished and have precisely determined tensile strength characteristics. It may be desirable or necessary for safety purposes to provide the shaft elements in the area of the extensions with a protective device or guard to prevent the uncontrolled spinning off of torn carrier links. If operation has been halted due to overload, new carrier links 8 may be quickly and simply placed into position and the coupling and the overload control will be reestablished for renewed and continued operation.

The scale division shown in FIG. 7 facilitates the measurement of an overload which is insufficient to rupture the carrier links 8. In this case, some plastic deformation of the carrier links 8 may result which causes minor relative torsion of the extension halves 7a, 7b. Based on the amount of the relative movement, which may be read directly from the scale, and the properties of the material used for carrier links 8, it is possible to calculate or to establish the degree of the overload.

While the overload control couplings herein described constitute preferred embodiments of the invention, it is to be understood that the invention is not limited to these precise constructions and that changes may be made therein without departing from the scope of the invention, which is defined in the appended claims.

I claim:

1. An overload control coupling between two rotating machine elements having at least two generally semi-cylindrical extensions radially arranged at each of the machine elements and uniformly distributed over the circumference thereof; and extensions cooperating to form cylinders having separating planes parallel with the rotation of the machine elements; the cylinders being embraced by annular power-transmitting carrier links which thereby connect the two machine elements and which links, in the event of their failure due to an overload of the coupling, separate the connection, characterized in that
   a. said carrier links comprise rings made of strong, rigid material;
   b. said rings embrace said extensions under an intitial stress;
   c. a plurality of camming scrapers are formed on said elements and are arranged between said extensions in a peripheral direction;
   d. the radial extent of said scrapers equal at least that of the extensions; and
   e. said scrapers having scraper planes parallel with the shaft axis of said elements and forming an angle of at least 90° with the bases of adjacent extensions.

2. The overload control coupling of claim 1, further characterized in that
   a. said rings are of hardened steel.

3. The overload control coupling of claim 1, further characterized in that
   a. said scraper planes extend outwardly from the bases of said extensions and include arcuate central portions.

4. The overload control coupling of claim 1, further characterized in that
   a. the curve of each semi-cylindrical cross section of the extensions in the transition area towards the separating plane is either continuously and/or increasingly arched towards the plane;
   b. the extensions are fitted together without any tolerance at the separation planes.

5. The apparatus of claim 1, further characterized in that
   a. the interior wall sections of the rings facing the edges of the interface of the semi-cylindrical extensions are curved so that they recede from the circular cross section of the cylinders formed by said semi-cylindrical extensions.

6. The apparatus of claim 1, further characterized in that
   a. said elements are provided with means of maintaining a constant coefficient of friction.

7. The apparatus of claim 1, further characterized in that
   a. scale divisions are formed on the frontal planes of the semi-cylindrical extensions at the edges of separation planes;
   b. said scale divisions graphically indicating the degree of the overload in case of plastic deformation of the carrier links.

* * * * *